(12) United States Patent
Park (10) Patent No.: US 8,315,154 B2
(45) Date of Patent: Nov. 20, 2012

(54) TIME REDUCTION FOR MULTIPLE LINK RECOVERY

(75) Inventor: Minyoung Park, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 523 days.

(21) Appl. No.: 12/645,923

(22) Filed: Dec. 23, 2009

(65) Prior Publication Data

US 2011/0149722 A1   Jun. 23, 2011

(51) Int. Cl.
*H04J 1/16* (2006.01)
(52) U.S. Cl. .................. 370/216; 370/338; 342/359
(58) Field of Classification Search .......... 370/216, 370/252, 310, 312, 329, 334, 338, 341, 432; 342/368, 372, 350, 360, 371, 359; 455/63.1, 455/62
See application file for complete search history.

(56) References Cited

U.S. PATENT DOCUMENTS

| | | | |
|---|---|---|---|
| 2007/0230373 A1 | 10/2007 | Li et al. | |
| 2007/0287384 A1 | 12/2007 | Sadri et al. | |
| 2009/0232023 A1 | 9/2009 | Soffer et al. | |
| 2009/0238156 A1 | 9/2009 | Yong et al. | |
| 2010/0054223 A1* | 3/2010 | Zhang et al. | 370/338 |
| 2010/0056062 A1* | 3/2010 | Zhang et al. | 455/63.1 |
| 2010/0103045 A1* | 4/2010 | Liu et al. | 342/372 |
| 2010/0157955 A1* | 6/2010 | Liu et al. | 370/336 |
| 2010/0214169 A1* | 8/2010 | Kafle | 342/368 |
| 2010/0322130 A1* | 12/2010 | Gong et al. | 370/312 |
| 2011/0069688 A1* | 3/2011 | Zhang et al. | 370/338 |

FOREIGN PATENT DOCUMENTS

| | | |
|---|---|---|
| WO | 2011/087611 A2 | 7/2011 |
| WO | 2011/087611 A3 | 7/2011 |

OTHER PUBLICATIONS

International Search Report received for PCT Patent Application No. PCT/US2010/058790, mailed on Aug. 26, 2011, 11 pages.
International Search Report received for PCT Patent Application No. PCT/US2010/058790, mailed on Aug. 26, 2011, 6 pages.

\* cited by examiner

*Primary Examiner* — Abdullah Riyami
(74) *Attorney, Agent, or Firm* — Schubert Law Group PLLC (57) ABSTRACT

Apparatuses, systems, and methods that reduce the amount of time for recovering multiple beam-formed links in a wireless network are disclosed. An embodiment may, e.g., be a mobile computing device with wireless beamforming communications capabilities. Upon establishing links with multiple stations, the mobile computing device may sense that the link quality or strength is degrading for several of the links. The laptop may transmit a single forward-transmission sector sweep (FWD-TXSS) to initiate recovery of the links. The other stations previously linked to the laptop may detect the degradation the links and start monitoring for the single FWD-TXSS. The receiving devices may each perform reverse-transmission sector sweeps (REV-TXSS), in sequence, to reestablish beam-formed links with the laptop without requiring multiple forward-transmission sector sweeps.

25 Claims, 8 Drawing Sheets

FIG. 1A

MULTIPLE BEAM-FORMED LINKS

FIG. 1B

MOVEMENT MAY DEGRADE / BREAK LINKS

FIG. 3A
FORWARD-TXSS (DEV1 -> DEV2)

FIG. 3B
REVERSE-TXSS (DEV2 -> DEV1)

FIG. 4

MULTIPLE LINK RECOVERY WITH MULTIPLE FWD-TX SECTOR SWEEPS

FIG. 5
MULTIPLE LINK RECOVERY WITH SINGLE FWD-TX SECTOR SWEEP

TIME REDUCTION FOR MULTIPLE LINK RECOVERY

FIELD

The embodiments herein are in the field of communications. More particularly, the embodiments relate to methods, apparatuses, and systems that reduce the amount of time for recovering multiple links in a wireless-network.

BRIEF DESCRIPTION OF THE DRAWINGS)

Aspects of the embodiments will become apparent upon reading the following detailed description and upon reference to the accompanying drawings in which like references may indicate similar elements.

DETAILED DESCRIPTION OF EMBODIMENTS

The following is a detailed description of embodiments depicted in the accompanying drawings. The specification is in such detail as to clearly communicate the embodiments. However, the amount of detail offered is not intended to limit the anticipated variations of embodiments. To the contrary, the intention is to cover all modifications, equivalents, and alternatives consistent with the spirit and scope of the embodiments as defined by the appended claims.

Electronic devices like personal computers, cellular telephones, personal digital assistants (PDAs) may employ Wireless Personal Area Network (WPAN) and Wireless Local Area Network (WLAN) standards in order to communicate with one another and with peripheral devices. Numerous standards define how WPANs and WLANs may be structured and operate. Example standards are the Bluetooth® (BT) 1.2, the Institute of Electrical and Electronic Engineers (IEEE) Std 802.15.3 and the IEEE 802.11 standards.

The following specification employs the term beamforming (BF) throughout. Beamforming may generally be interpreted as a technique of using several antenna elements to spatially shape emitted electromagnetic waves transmitted from a wireless communication device. The communication device may employ any one of a variety of different methods to focus, concentrate, or "beam" the energy into a receiving device. The communication device may focus the transmitted energy by, for example, adjusting or manipulating the magnitude and phase of the transmitted signals from individual antenna elements of an antenna array. Similarly, the receiving device may also manipulate one or more different antenna elements of an antenna array to concentrate the received signal. Such beamforming activities may require the transmitting and receiving devices to perform channel sounding to optimize the shape and direction of the beam.

Generally speaking, methods, apparatuses, and systems that reduce the amount of time for recovering multiple beam-formed links in a wireless network are contemplated. A system embodiment may, e.g., be a mobile computing device, such as a laptop, with wireless communications capabilities, such as an integrated wireless networking card. The networking card of the laptop may transmit and receive various types of frame data using one or more beam forming techniques.

Upon establishing links with multiple stations or wireless communication devices and adjusting various parameters of the links using beamforming techniques to create multiple beam-formed links, the laptop may sense that the link quality or strength is degrading for several of the links. For example, the laptop may sense that the links are becoming substantially weaker or that the links have been totally severed. Instead of having to reestablish new links using multiple forward-transmission sector sweeps, embodiments of the laptop described herein may instead transmit a single forward-transmission sector sweep (FWD-TXSS). The other stations that were previously linked to the laptop may detect the degradation or loss of the links between the stations and the laptop and start monitoring for the single FWD-TXSS. The receiving devices may each perform reverse-transmission sector sweeps, (REV-TXSS), in sequence, to reestablish beam-formed links with the laptop without requiring multiple forward-transmission sector sweeps.

A method embodiment may involve a multiple-link station detecting degradation of first and second links between the multiple-link station, a first station, and a second station, respectively. The first and second links comprise beam-formed links of a wireless network. In response to detecting degradation of the first and second links, the method embodiment also includes the multiple-link station transmitting a plurality of frames of a forward sweep to the plurality of sectors. Each frame of the plurality comprises a destination address for the first station and a destination address of the second station. The method also includes the multiple-link station transmitting a first feedback frame to the first station and a second feedback frame to the second station, with each feedback frame in response frames of reverse sweeping by the first and second stations. The response frames of reverse sweeping are in response to the multiple-link station transmitting the plurality of frames of the forward sweep.

A first embodiment of an apparatus may comprise a receiver, a transmitter coupled to an antenna, and a processor module coupled to the receiver and the transmitter. The transmitter is configured to selectively transmit frames of a sector sweep in a plurality of sectors about the periphery of the antenna. The processor module enables the transmitter to transmit the frames of the sector sweep upon detection of degradation of two wireless links between the receiver and two stations, with each of the two links comprising beam-formed wireless links. The processor also enables the transmitter to transmit two feedback frames in response to two frames of reverse sweeps, each one of the two frames of reverse sweeps transmitted sequentially from each one of the two stations in response to the sector sweep.

An alternative embodiment of an apparatus may comprise a receiver, a transmitter coupled to an antenna, and a processor coupled to the receiver and the transmitter. The transmitter is configured to selectively transmit frames of a reverse sweep in a plurality of sectors about the periphery of the antenna. The processor enables the receiver to receive a frame of a sector sweep upon detection of degradation of a beam-formed wireless link between the receiver and a station. The processor also enables the transmitter to transmit the frames of the reverse sweep in response to reception of the frame of the sector sweep. Further, the processor determines when to transmit the frames of the reverse sweep based on an order of destination addresses in the frame of the sector sweep.

An embodiment of a system may comprise an antenna array, a beamforming module coupled to the antenna array, a transmitter and a receiver coupled to the beamforming module, and a processor coupled to the receiver and the transmitter. The beamforming module manipulates the antenna array to transmit frames of a sector sweep to a plurality of sectors about the antenna. The beamforming module is configured manipulate the antenna array to transmit single frames to single sectors of the plurality. The processor enables the transmitter to transmit the frames of the sector sweep upon detection of degradation of two beam-formed wireless links between the receiver and two stations. The processor also enables the transmitter to transmit two feedback frames in response to two frames of reverse sweeps, with each one of the two frames of reverse sweeps transmitted sequentially from each one of the two stations in response the sector sweep.

Various embodiments disclosed herein may be used in a variety of applications. Some embodiments may be used in conjunction with various devices and systems, for example, a transmitter, a receiver, a transceiver, a transmitter-receiver, a wireless communication station, a wireless communication-device, a wireless Access Point (AP), a modem, a wireless modem, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a network, a wireless network, a Local Area Network (LAN), a Wireless LAN (WLAN), a Metropolitan Area Network (MAN), a Wireless MAN (WMAN), a Wide Area Network (WAN), a Wireless WAN (WWAN), devices and/or networks operating in accordance with existing IEEE 802.16e, 802.20, 3 GPP Long Term Evolution (LTE) etc. and/or future versions and/or derivatives and/or Long Term Evolution (LTE) of the above standards, a Personal Area Network (PAN), a Wireless PAN (WPAN), units and/or devices which are part of the above WLAN and/or PAN and/or WPAN networks, one way and/or two-way radio communication systems, cellular radio-telephone communication systems, a cellular telephone, a wireless telephone, a Personal Communication Systems (PCS) device, a PDA device which incorporates a wireless communication device, a Multiple Input Multiple Output (MIMO) transceiver or device, a Single Input Multiple Output (SIMO) transceiver or device, a Multiple Input Single Output (MISO) transceiver or device, a Multi Receiver Chain (MRC) transceiver or device, a transceiver or device having "smart antenna" technology or multiple antenna technology, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), Time-Division Multiplexing (TDM), Time-Division Multiple Access (TDMA), Extended TDMA (E-TDMA), Code-Division Multiple Access (CDMA). Multi-Carrier Modulation (MDM). Discrete Multi-Tone (DMT). Bluetooth®, ZigBee™, or the like. Embodiments may be used in various other apparatuses, devices, systems and/or networks.

Figure 1A:
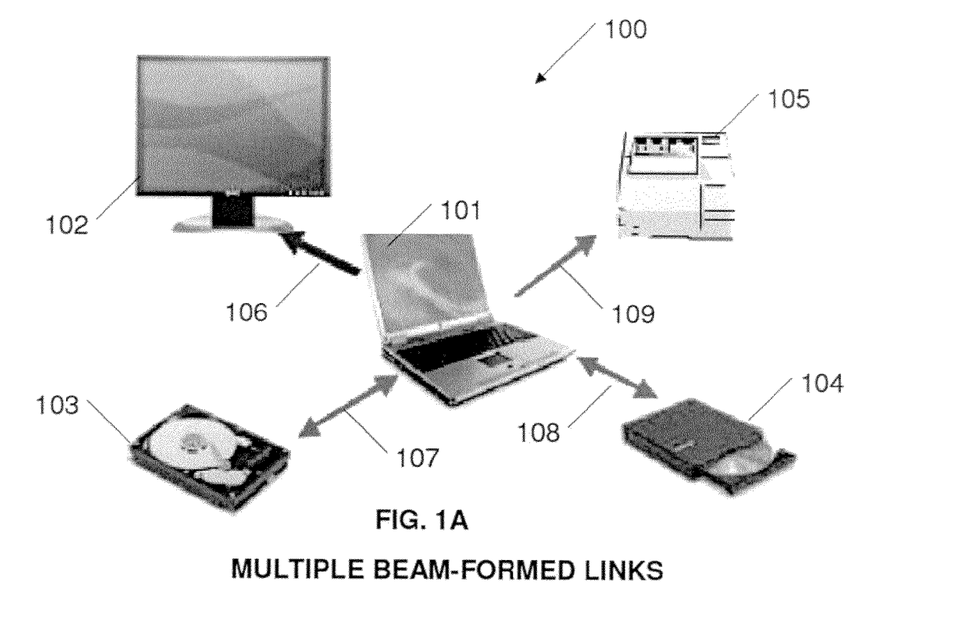
FIG. 1A depicts an embodiment of a wireless personal area (PAN) network with multiple beam-formed communication links.

Turning now to the drawings, FIG. 1A depicts an embodiment of a WPAN 100, with multiple beam-formed communication links, having stations that may reduce the amount of time for recovering multiple links when the links are lost or otherwise degrade. For example, one or more stations of WPAN 100 may communicate via the 60 gigahertz (GHz) band and employ one or more beamforming technologies. It should be appreciated that various types of local area networks for transmitting data to and receiving data from network stations using beamforming technologies may be employed in various exemplary embodiments. For example, in an alternative embodiment, WPAN 100 may instead comprise an IEEE 802.11 network, a WEAN, a general packet radio service (GPRS) network, a global system for mobile communication (GSM) network, a code division multiple access (CDMA) network, a Bluetooth® network, or other suitable wireless network which employs beam-formed communication links.

As shown in FIG. 1A, WPAN 100 includes a first station 101 having multiple communication links (106, 107, 108, and 109) with other stations of WPAN 100. In the embodiment depicted in FIG. 1A, station 100 comprises a laptop connected to station 102, via link 106, and connected to station 103 via link 107. Station 100 is also connected to station 104, via link 108, and connected to station 105 via link 109. Stations 102, 103, 104, and 105 comprise a monitor, a hard disk drive, an optical storage drive, and a printer, respectively, each a peripheral device comprising wireless communication capabilities. For example, WPAN 100 may comprise a network in a home networking environment where a user plays a movie from a digital versatile disc (DVD) in station 104 via her laptop and displays the video content on the monitor station 102. The types of devices in the wireless network will vary from embodiment to embodiment and may include other types of devices not shown in FIG. 1A. For example, many embodiments may comprise a station that is an access point (AP).

The stations of WPAN 100 may comprise network stations provided within a cell under a common coordinating function, which may be provided by, e.g., station 101. In other words, one of the stations, such as station 101, may act as a network coordinator (such as a Piconet Coordinator Point, or PCP) to coordinate communications among stations 101, 102, 103, 104, and 105 by controlling access to the wireless medium. When acting as the network coordinator, station 101 may broadcast a beacon frame that indicates the length of a beacon interval during which communications are to take place. The beacon frame may be received by the various stations of WPAN 100, thereby informing the stations as to when the next beacon interval will occur. In some embodiments, the next beacon interval may be identified by a beacon transmission.

It should be appreciated that the stations 101, 102, 103, 104, and 105 may be connected to other devices and/or networks with which the stations may communicate. Further, though FIG. 1A only shows five stations within WPAN 100, it should be appreciated that an alternative embodiment may include more or fewer than five stations. As will be illustrated, one or more of the stations in WPAN 100 may reduce the amount of time for recovering links when the links are lost or otherwise degraded to improve the performance of WPAN 100.

One or more of the stations of WPAN 100 may utilize an antenna array, or possibly a number of antenna arrays, to communicate within another station via a number of antenna sectors. Stations of WPAN 100 may support one or more beamforming (BF) technologies that transmit and focus transmission energy in a variety of different directions, or sectors. BF allows a pair of stations to achieve a desirable link budget for subsequent communication. To illustrate the concept of beamforming in more detail, and prepare for describing how an embodiment may reduce the amount of time for recovering multiple beam-formed links when the links degrade, we briefly turn to FIGS. 2A and 2B.

Figure 2A:
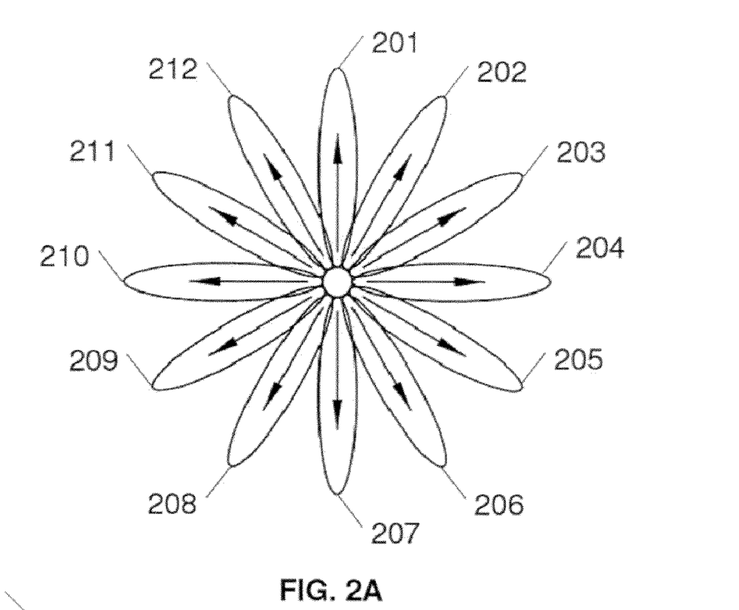
FIG. 2A illustrates a plurality of antenna sectors provided by an antenna in accordance with some embodiments.

FIG. 2A illustrates a plurality of antenna sectors, 201-212, provided by an antenna array of a station, in accordance with some embodiments. For example, each of the stations of WPAN 100 may use an antenna array to selectively transmit a signal in one of the antenna sectors. In other words, an antenna array of a station may focus or direct the transmitted energy during a transmission in one direction, such as in the direction of antenna sector 203, and then manipulate an antenna element to cause the transmitted energy to be focused or directed in a different direction, such as in the direction of antenna sector 204.

Although FIG. 2A shows only twelve antenna sectors (201-212) for a single embodiment, alternative embodiments may support beamforming with a lesser or greater number of antenna sectors. For example, in some embodiments the antenna array may be able to focus the transmission energy in 24 different sectors, in 48 sectors, or even more antenna sectors. Further, stations in a wireless network are not required to each communication using the same number of antenna sectors. For instance, station 101 may be able to transmit frames via 48 sectors while station 105 is only able to transmit frames in 12 antenna sectors.

Figure 2B:
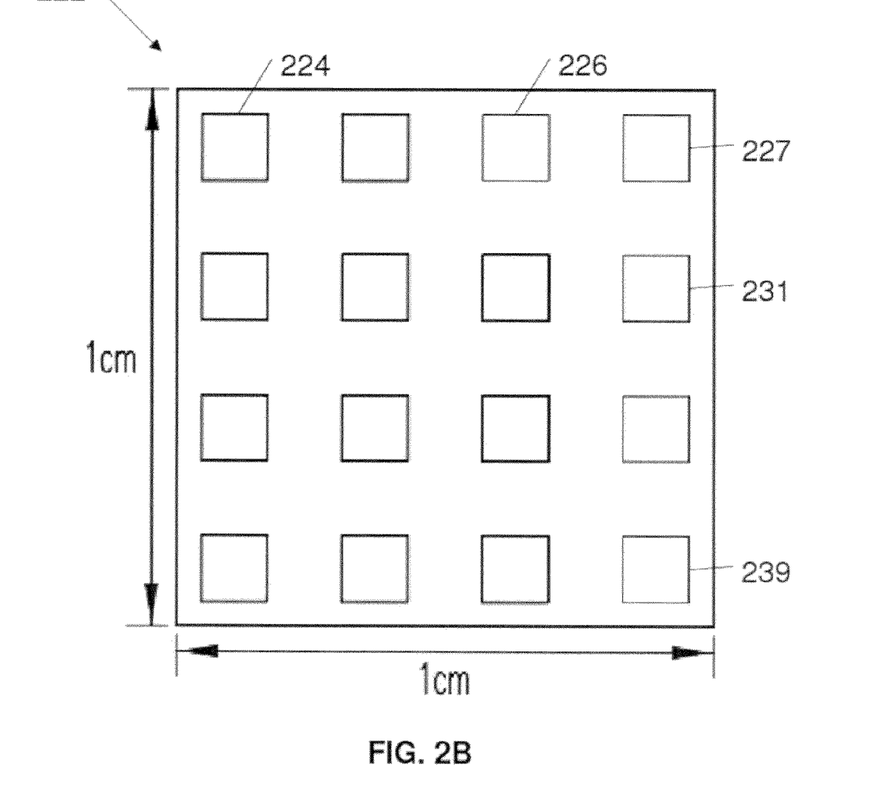
FIG. 2B depicts a portion of an antenna array.

FIG. 2B depicts a portion 222 of an antenna array, in accordance with some embodiments. In these embodiments, portion 222 may be a portion of an antenna array for a station in WPAN 100. For example, portion 222 may comprise a plurality of antenna elements (224-239) configured to transmit and receive millimeter-wave signals within antenna sectors 201-204 of FIG. 2A, or perhaps 201-212 depending on the embodiment, utilizing one or more beamforming techniques. The plurality of antenna elements 224-239 may provide a higher gain and allow the beamwidth and the beam direction of the transmitted energy to be controlled by signal processing techniques either in the analog or the digital domain. In these embodiments, the antenna arrays may operate as a phased array with a predetermined spacing between the antenna elements 224-239.

In some embodiments, stations of WPAN 100 may utilize one or more antenna arrays which may be configured to selectively transmit in each antenna sector of antenna sectors 201-212. The number of antenna elements used to selectively transmit data in one or more of the sectors may differ based on the direction and the embodiment. For example, in some embodiments, at least two antenna elements may be used per each antenna sector. Other embodiments may employ four or more antenna elements to transmit in each of the antenna sectors. In some embodiments, the antenna array may comprise 64 or more antenna elements configurable to transmit in any one or more of the antenna sectors.

While portion 222 is depicted as being within a 1 centimeter (cm) square, alternative embodiments may employ antenna arrays having different shapes and different dimensions. For example, one alternative embodiment of a station may employ four antenna arrays, with one antenna array on each side of the station. In the alternative embodiment, each of the antenna arrays may comprise nine antenna elements generally arranged in the shape of a circle and configured to transmit data in a plurality of sectors, such as five different sectors each from the respective side of the station associated with the specific antenna array. Further, for the alternative embodiment, the station may use one antenna array to communicate with one station, yet use another antenna array located on a different side of the station to communicate with the other station.

Returning back to FIG. 1A, one or more of stations 101, 102, 103, 104, and 105 may provide legacy support for beamforming. The stations may provide legacy support by generally using a specific standard e.g. the Institute of Electrical and Electronics Engineers (IEEE) standard 802.15.3e. In other words, one or more of stations 101, 102, 103, 104, and 105 may conform to standards adopted by such alliances, organizations, or groups as the Wireless Gigabit Alliance (a.k.a. WiGig or WGA). WirelessHD®, European Computer Manufacturers Association (ECMA), perform BF through the transmission of dedicated BF frames used by the BF protocol.

Figure 3A:
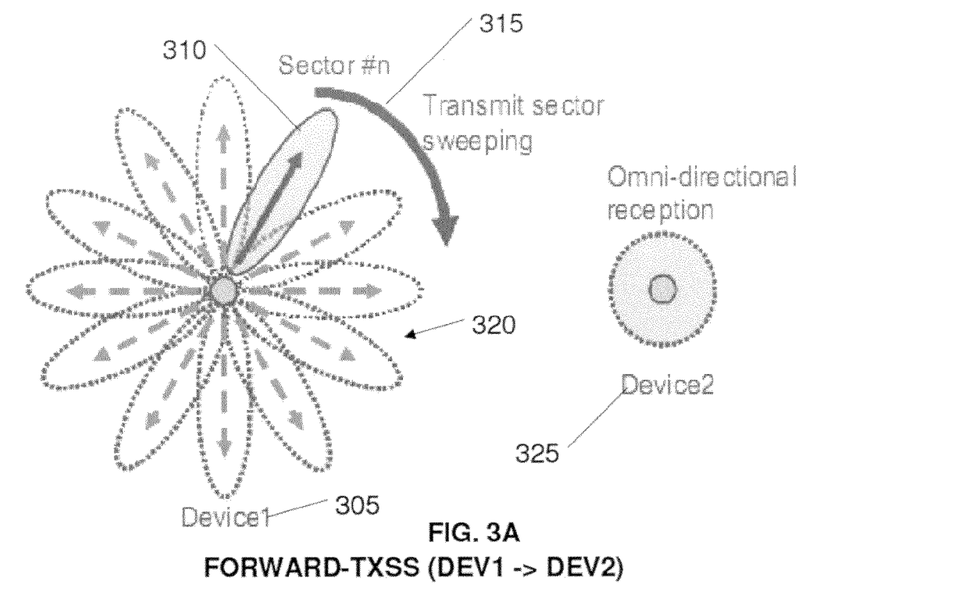
FIG. 3A illustrates how a device may transmit a plurality of forward-transmission sector sweeping frames as part of a beamforming process with another device.

When providing legacy support for beamforming, a station may act as an initiating station to initiate BFT with other the other stations in WPAN 100. For example, station 101 may act as an initiating station to initiate BFT with station 102. When station 101 is the initiator, station 102 may be referred to as a responding station, or responder. FIG. 3A illustrates in more detail how a device, such as station 101, may transmit a plurality of forward-transmit sector sweep (FWD-TXSS) frames as part of a beamforming process with another device, such as station 102. For the sake of illustration, one may assume that station 101 is represented by device 305, while station 102 is represented by device 325.

Forward Transmit Sector Sweeping

The initiating device 305 in FIG. 3A, may announce a number of sector-sweep (SS) slots of a BFT period and generate numerous SS frames within each SS slot. During a single SS slot, device 305 may transmit a first FWD-TXSS frame in sector 310. Device 305 may then sequentially transmit subsequent FWD-TXSS frames for the other antenna sectors 320 as part of a sector sweep 315, trying to find a sector in which device 325 may be able to receive subsequent transmission frames. In other words, device 305 may be sweeping through its antenna sectors, while device 325 listens to the channel in an omni-directional receiving mode, trying to find a sector that provides an acceptable communication channel with device 325. Upon transmitting FWD-TXSS frames to a predefined number of antenna sectors, device 305 may switch from a transmit mode to the omni-directional mode and monitor the wireless medium for transmitted data.

Reverse Transmit Sector Sweeping

Figure 3B:
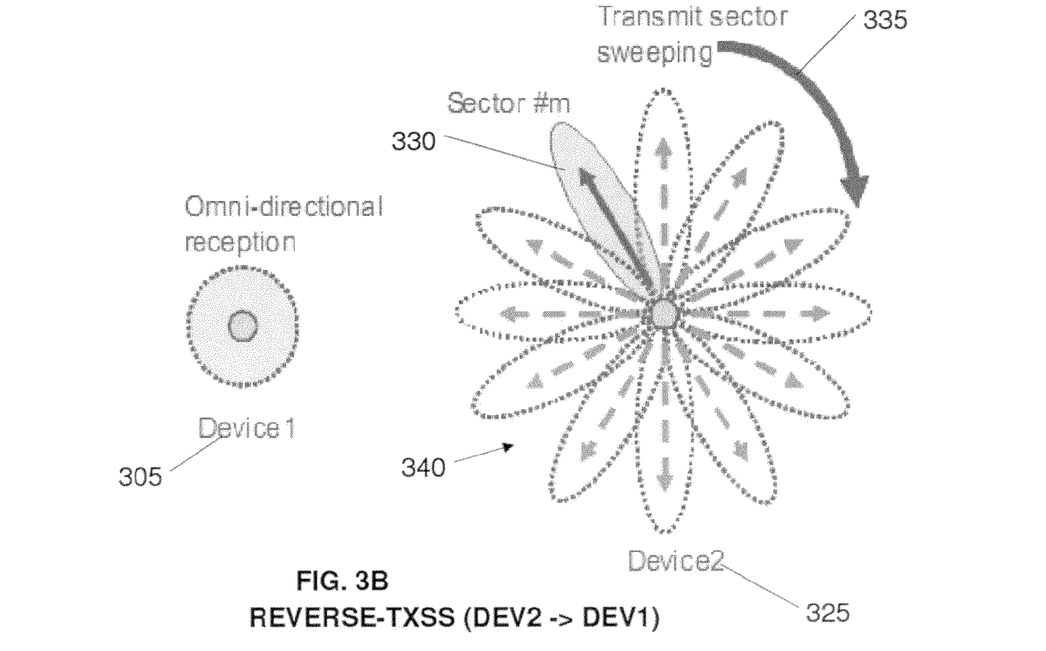
FIG. 3B illustrates how a device may transmit a number of reverse-transmission sector sweeping frames as part of a beamforming process another device.

Upon receiving one or more of the frames from the FWD-TX sweep of sectors 320, device 325 may itself respond by switching out of the omni-directional mode and performing a reverse sector sweep to determine a sector that optimally enables communication with device 305. This separate reverse-transmit sector sweep (REV-TXSS) is shown in FIG. 3B. Device 325 may transmit a first REV-TXSS frame in sector 330. Device 325 may then sequentially transmit subsequent REV-TXSS frames for the other antenna sectors 340 as part of a reverse sector sweep 335, trying to find a suitable sector for communication with device 305.

Upon each device or station transmitting a series of frames while in a transmit mode, and switching to a listening or monitoring mode when not transmitting, each device may determine which antenna sector the peer station requests that the station use. Each station may determine the desired antenna sector by examining information of the frame transmitted by the peer station. For example, device 325 may have received a frame with a sector identification number of "0011" in one of the FWD-TXSS frames transmitted from device 305 and selected that sector based on the quality of the signal. In response, when device 325 transmits its REV-TXSS frames during its reverse sweep, device 325 may include the "0011" in the frames to inform device 305 to use that sector when communicating with device 325. Similarly, device 305 may determine the best sector that device 325 should use when transmitting data to device 305 based on the sector identification data of the REV-TXSS frames.

Figure 4:
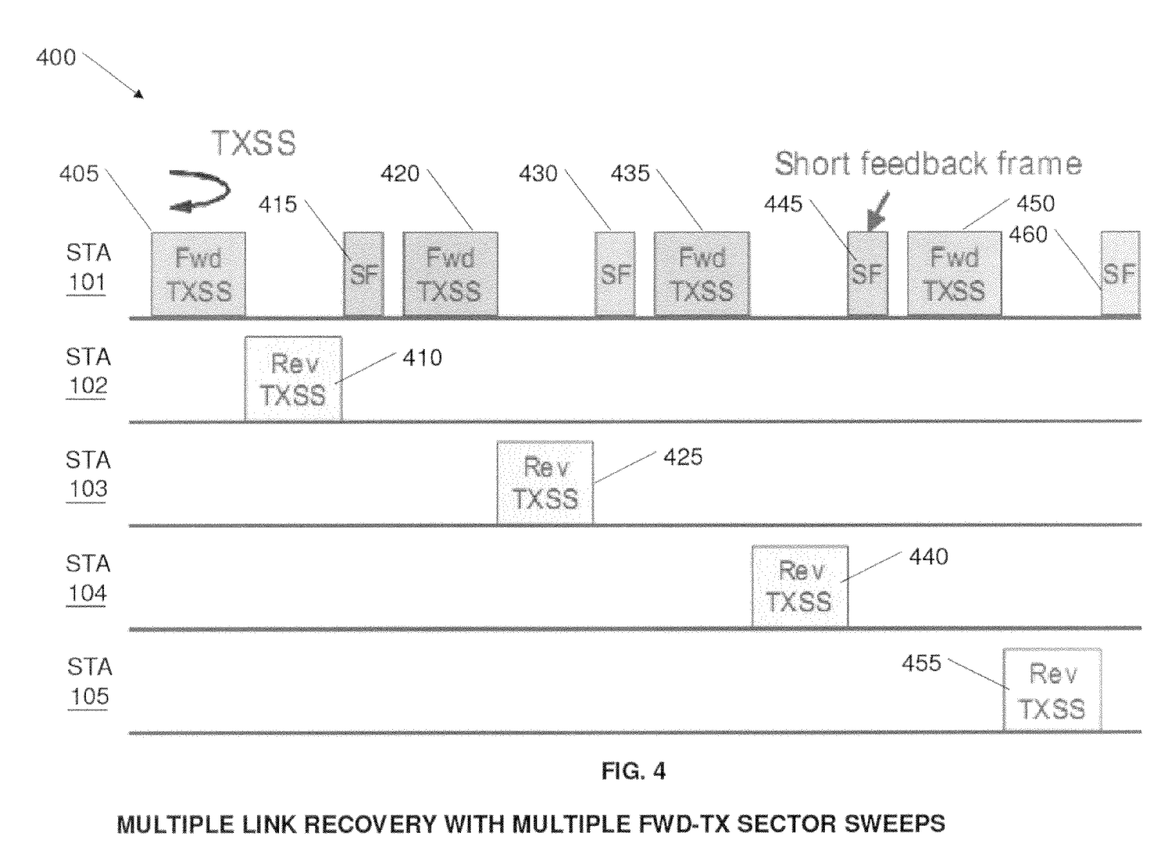
FIG. 4 illustrates a multiple-link recovery process using multiple forward transmission sector sweeps.

FIG. 4 shows a timing diagram 400 which illustrates the aforementioned beamforming process between the stations of FIG. 1A according to a number of beamforming procedures, as illustrated by FIGS. 3A and 3B, to form links with the stations of WPAN 100. The beamforming process illustrated in FIG. 4 may be used to establish the initial beam-formed links (106, 107, 108, and 109). Further, the beam forming process illustrated by FIG. 4 may be used by stations when operating in a legacy mode to communicate with devices that are not able to reestablish multiple links according to the embodiments disclosed herein. In other words, FIG. 4 illustrates a legacy method of establishing and recovering severed links. Embodiments may recover or reestablish severed links in a different manner, which will be illustrated in FIG. 5.

Timing diagram 400 illustrates how station 101 may initiate the beamforming process by transmitting a plurality of FWD-TXSS frames (element 405) intended to establish a beam-formed link with station 102. Station 102 may receive one or more of the plurality of FWD-TXSS frames and respond by transmitting a number of REV-TXSS frames (410), to which station 101 may respond by transmitting a short feedback frame 415. Upon the transmission of short feedback frame 415, station 101 and station 102 may have established beam-formed link 106.

Station 101 may establish beam-formed link with station 103 by transmitting another plurality of FWD-TXSS frames (element 420). Station 103 may receive one or more of the other plurality of FWD-TXSS frames and respond by transmitting a number of REV-TXSS frames (425), to which station 101 may respond by transmitting short feedback frame 430. Upon the transmission of short feedback frame 430, station 101 and station 103 may have established beam-formed link 107. In a similar fashion, station 101 may establish beam-formed links 108 and 109 with stations 104 and 105, respectively, by transmitting additional FWD-TXSS frames (elements 435 and 450) and short feedback frames 445 and 460 in response to the REV-TXSS frames (440 and 455) of station 104 and station 105, respectively. In other words, the stations of WPAN 100 may transmit TX-SS frames in an alternating fashion to exchange, detect, select, and communicate the selected sector information based on the sector identification numbers in the frames that each station receives. Upon establishing the beam-formed links between the stations the relationship of the links with the stations may be similar to that depicted in FIG. 1A.

Figure 1B:
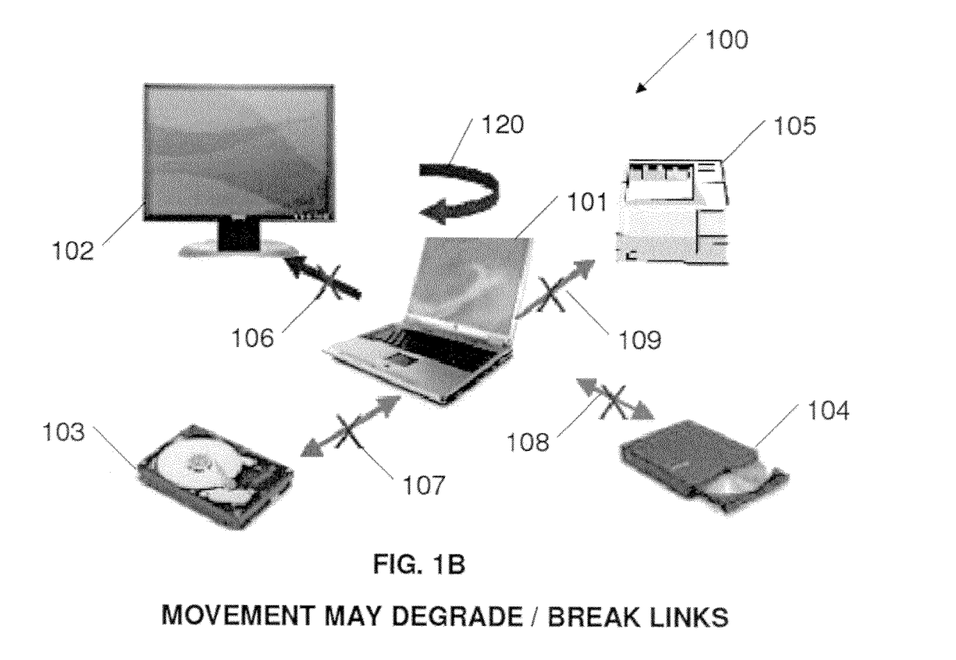
FIG. 1B illustrates how the movement of a station may affect multiple links in a wireless network.

Although beamforming compensates the high propagation loss of the 60 GHz band, the links are generally sensitive to the movement of the devices due to the narrower beamwidth of the beam-formed links. For example, if the user suddenly moves the laptop as illustrated in FIG. 1B, (element 120), the direction of the beamforming for each link changes and may sever or at least degrade the links depending on the amount of movement. Consequently, all the links may need to be re-beamformed one by one. If the laptop employs the procedure illustrated by FIG. 4, the overhead will be significant, impacting the operation and degrading the overall system performance of WPAN 100 in terms of throughput and latency. Depending on the number of antenna arrays on the laptop and the number of devices beam-formed to, the re-beamforming operation can take up to tens of milliseconds. However, the stations of WPAN 100 may instead employ a new method of recovering the multiple links, which may reduce the overhead of the recovery process and increase the performance of WPAN 100.

Figure 5:
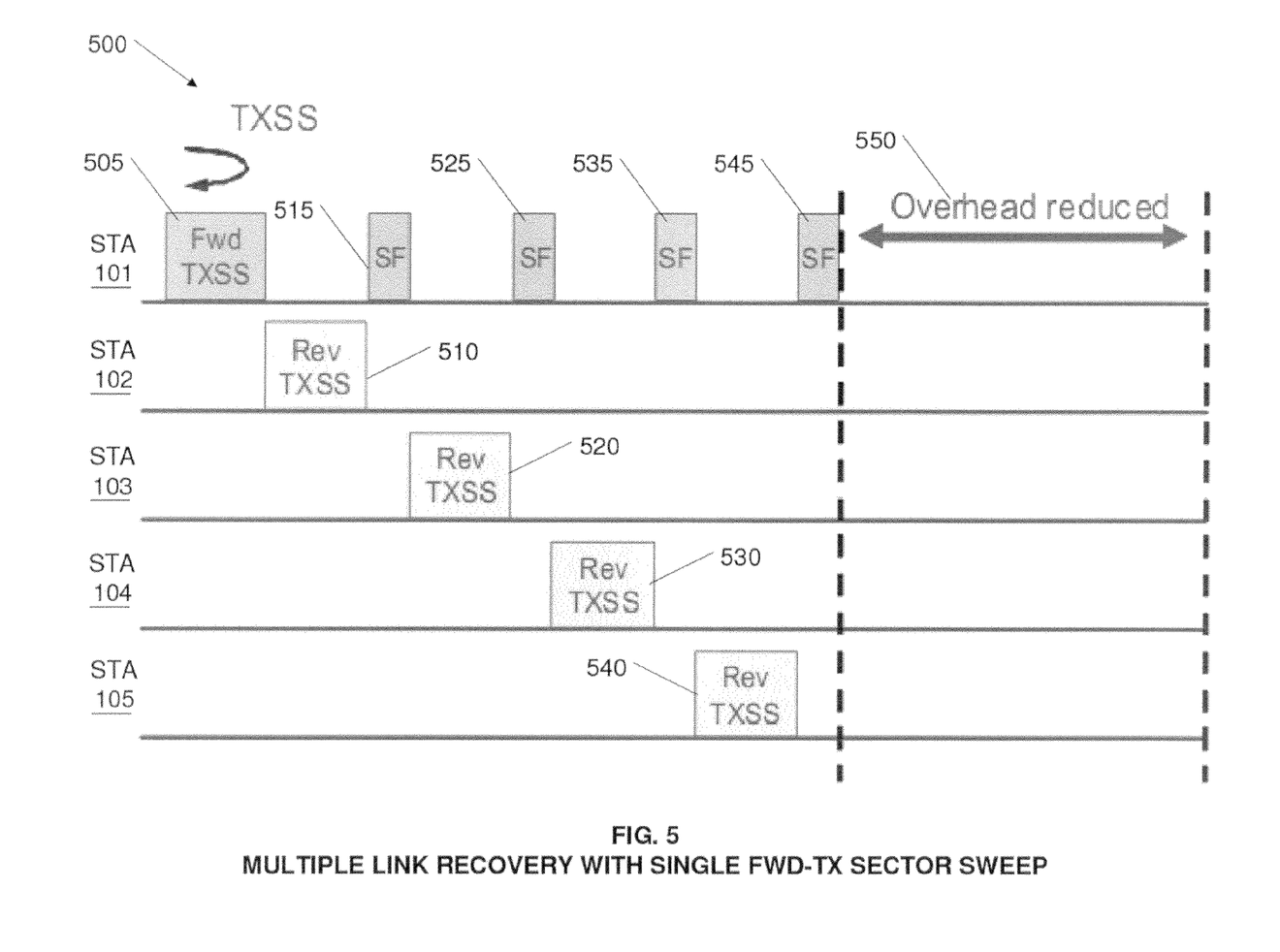
FIG. 5 illustrates a multiple-link recovery process using a single forward transmission sector sweep.

Instead of employing the method of establishing multiple links shown in FIG. 4, stations consistent with one or more embodiments may instead employ the method of recovering multiple links depicted in FIG. 5. FIG. 5 illustrates how information of the FWD-TXSS of the beamforming procedure may be shared among the multiple stations to recover multiple links more efficiently. Because one or more frames from the FWD-TXSS may be received by each of the stations that lost a link, there may be no need to repeat the FWD-TXSS for the beamforming procedure of each link.

By referencing FIG. 1B and FIG. 5, when station 101 detects that the links to the other stations (102, 103, 104, and 105) are lost or degraded, station 101 may initiate the multiple-link recovery procedure. The start time of the multiple-link recovery procedure may be pre-negotiated or pre-established with each of the stations. For example, in some embodiments, the stations may negotiate the recovery process upon establishing each of the beam-formed links, such as which station shall initiate the recovery procedure and approximately when the recovery procedure should start after loss of the link.

Alternatively, the stations may be preconfigured to start the recovery process based on the type of device and/or role assumed in the network. For example, only devices designated as PCP controllers may initiate the recovery procedure in some embodiments. Alternatively, devices which only establish single links may be configured to only enter the recovery process as monitoring devices. Even further, in other alternative embodiments, the device given the responsibility to initiate the recovery procedure and transmit the FWD-TXSS frames may be passed around in a token-passing manner. As one having ordinary skill in the art will appreciate, the station designated to initiate the recovery process may be pre-determined in a variety of different ways. Following is one procedure proposed for multiple-link recovery.

Timing diagram 500 illustrates how station 101 may initiate the recovery procedure by transmitting FWD-TXSS frames (element 505) between station 101 and each of the other stations. In other words, station 101 may transmit FWD-TXSS frames to each of the antenna sectors about station 101 different frames of which may be received by each of the other stations in relation to their position and the direction of the antenna sector of the transmitted frame. Station 101 may initiate the FWD-transmit sector sweep process while each of the other stations that lost its link to station 101 monitor the sector sweeping and record the best sector for the frame(s) which they receive. The order in which the responding stations should respond may be determined by data in the TXSS frames. Each TXSS frame may convey the destination addresses of the stations that lost the links to station 101. The order of the destination addresses in the TXSS frames may determine the order in which the stations should respond with REV-TXSS after the FWD-TXSS.

For example, assume the transmitted order in the FWD-TXSS frames is station 102, station 103, station 104, and station 105. Station 102 will be the first station to start a REV-TXSS (element 510). The TXSS frames transmitted by station 102 in the REV-TXSS (element 510) will convey the best sector information obtained during the FWD-TXSS between station 101 and station 102. During REV-TXSS (element 510) between station 102 and station 101, station 101 determines which sector is the best for station 101 to use to communicate with station 102.

Upon completing the REV-TXSS (element 510) between station 102 and station 101, station 101 transmits a short feedback frame 515 to station 102 with the best sector information. After completing the procedure between station 101 and station 102, the next station of the order, station 103, starts its REV-TXSS (element 520) as shown in FIG. 5. In response to receiving one or more frames from the REV-TXSS (element 520) with the best sector information selected by station 103, station 101 again sends a short feedback frame 525 with information to station 103. This process continues with the REV-TXSS for station 104 (element 530) and station 105 (element 540), to which station 101 sends short feed back frames 535 and 545, respectively.

Figure 6:
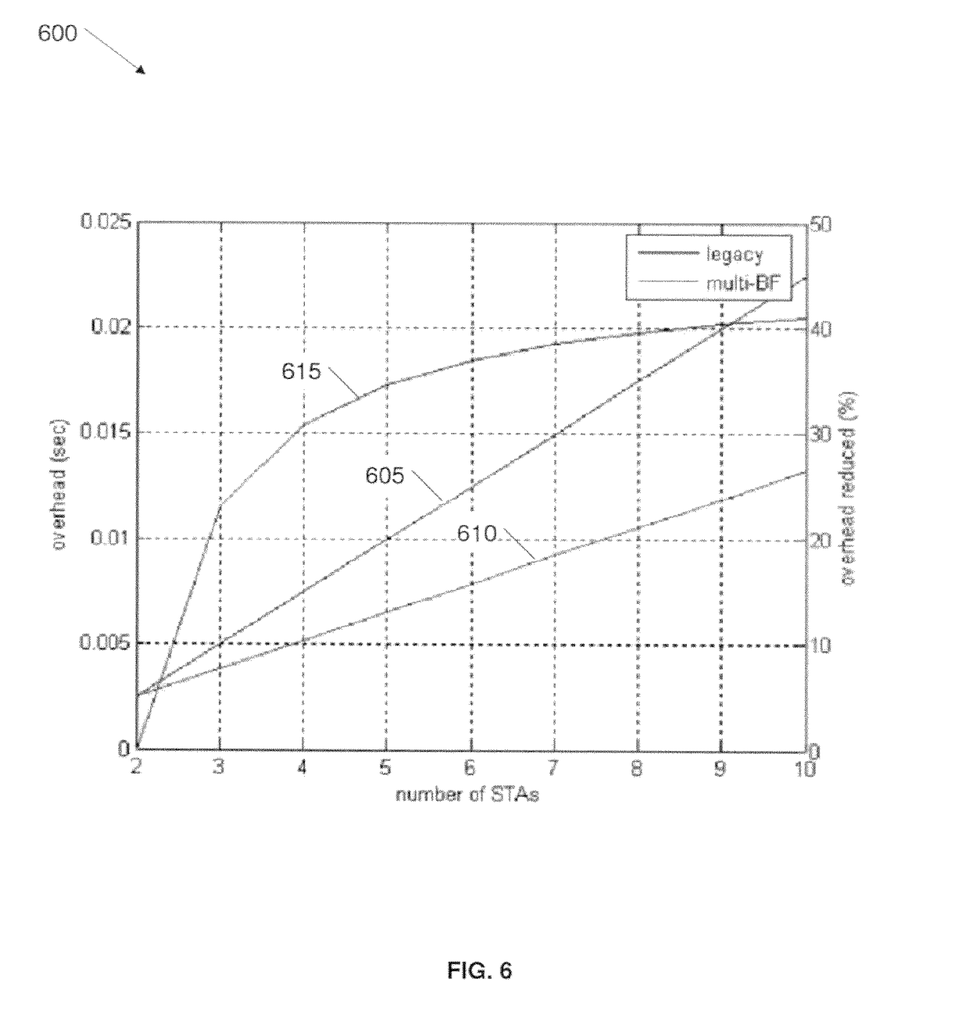
FIG. 6 shows a difference of overhead recovery times between a multiple-link recovery process that uses multiple forward transmission sector sweeps versus one that uses a single forward transmission sector sweep.

As shown in FIG. 5, by sharing the FWD-TXSS (element 505) among multiple stations 102, 103, 104, and 105, embodiments may significantly shorten the link recovery time for the multiple link recovery compared to the conventional way shown in FIG. 4 (see element 550). FIG. 6 shows a difference of overhead recovery times between a multiple-link recovery process that uses multiple forward transmission sector sweeps (conventional method of FIG. 4) versus one that uses a single forward transmission sector sweep (embodiment of method shown in FIG. 5). For analysis of the embodiments depicted in graph 600, all stations are each equipped with four antenna arrays. Further, each station has a total number 48 of sectors to sweep.

Graph 600 shows the overhead to recover multiple links in terms of time. Graph line 605 charts the recovery time for the conventional or legacy method (FIG. 4). Graph line 610 charts the recovery time for one embodiment (FIG. 5). As graph 600 illustrates by examining the overhead reduction line 615 and referencing the right-hand y-axis, for the 5 station case (4 links to recover), overhead reduction reaches 35% and saves approximately 3 milliseconds (ms) compared to recovering the links one by one without sharing the FWD-TXSS.

Figure 1C:
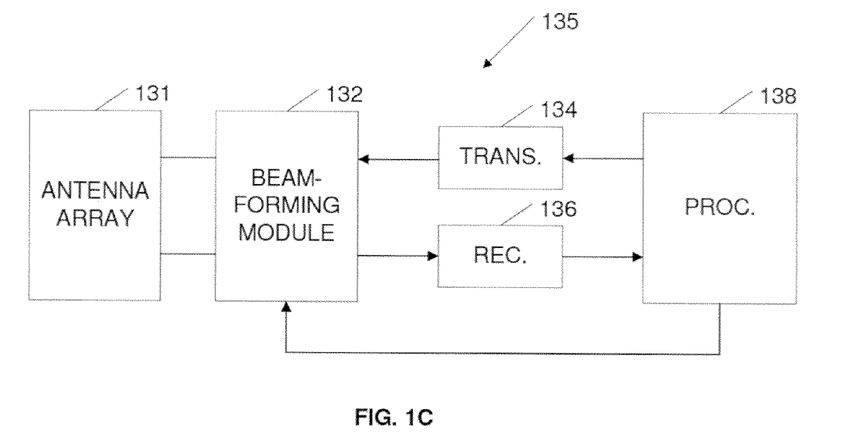
FIG. 1C depicts an embodiment of an apparatus that may reduce the amount of time for recovering multiple beam-formed links in a wireless network.

FIG. 1C is a block diagram of an apparatus 135 in accordance with some embodiments which enables reduced recovery time for multiple beam-formed links. For example, apparatus 135 may comprise a station, or at least part of a station, such as stations 101, 102, 103, 104, or 105 depicted in FIG. 1A. Apparatus 135 may be configured to transmit and receive frames of information in the 60 GHz band in many embodiments. However, in alternative embodiments, apparatus 135 may operate in bands other than the 60 GHz band. Apparatus 135 may include, among other things, an antenna array 131, beamforming module 132, transmitter 134, receiver 136, and processing circuitry or processor 138.

Antenna array 131 may include a plurality of antenna elements and may be configured to communicate in a plurality of antenna sectors, such as antenna sectors 201-212 in FIG. 2A. In some alternate embodiments, apparatus 135 may utilize a switched-beam antenna, although the scope of the embodiments is not limited in this respect. In some alternate embodiments, apparatus 135 may utilize a single antenna element, although the scope of the embodiments is not limited in this respect.

In accordance with some embodiments, beamforming module 132 may configure antenna array 131 to transmit an SS frame via transmitter 134 (e.g., FWD-TXSS frame or REV-TXSS frame) separately in each of the antenna sectors 201-212. For example, beamforming module 132 may configure antenna array 131 to transmit FWD-TXSS frames (element 505), depicted in FIG. 5. Processor 138 may assemble the data for the various frame fields, as well as include the sector information in one of the fields of an assembled frame. Processor may manipulate or control beamforming module 132 to transmit to the appropriate antenna sector as designated in the frame, and may then pass the frame to transmitter 134 which modulates the frame bits for transmission through antenna array 131. Beamforming module 132 may also configure antenna array 131 to receive reverse or "incoming" sector-sweep frames, such as REV-TXSS frames (element 510) also depicted in FIG. 5, via receiver 136. Processor 138 may decode and/or examine the received frames and make decisions accordingly. For example, processor 138 may examine the order of addresses in a received FWD-TXSS frame and determine the point in time when apparatus 135 should transmit its REV-TXSS frames during the recovery process.

Apparatus 135 may include other circuitry for communicating millimeter-wave wireless communication signals, including 60 GHz wireless technologies. In some embodiments, apparatus 135 can be used to provide a flexible interface that can be efficiently embedded into home media gateways, cell phones, flat panel televisions (TVs), set-top boxes, Blu-ray players, digital cameras, personal computers (PCs), laptops, and many other multimedia and communication devices. Although apparatus 135 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements of apparatus 135 may refer to one or more processes operating on one or more processing elements.

Figure 1D:
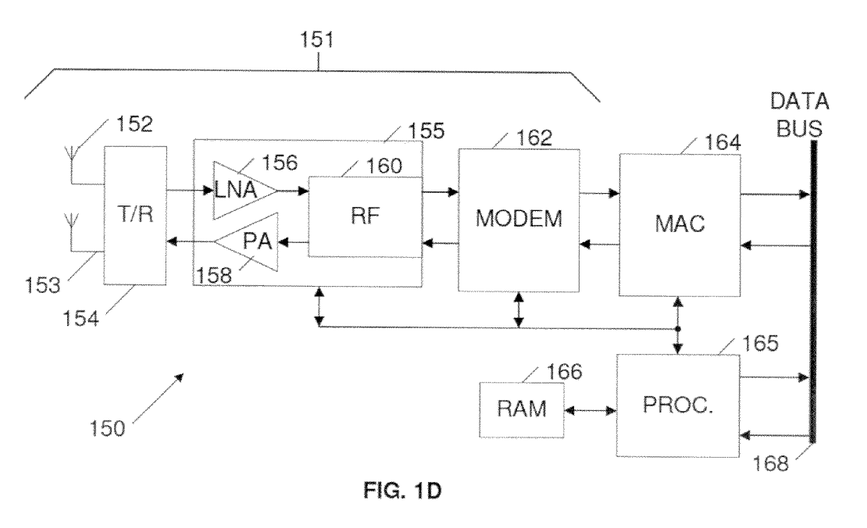
FIG. 1D depicts an alternative embodiment of an apparatus that may reduce the amount of time for recovering multiple links in a wireless network.

FIG. 1D depicts an alternative embodiment of an apparatus that may reduce the amount of time for recovering multiple links in a wireless network. For example, wireless communication system 150 may comprise a more specific embodiment of apparatus 135, which again may comprise station 101, 102, 103, 104, or 105, depicted in FIG. 1A. In some embodiments wireless communication system 150 may comprise part of a computer system, such as wireless access card of a notebook or a desktop computer. In other embodiments, wireless communication system 150 may comprise a networking device, such as a router that has an integrated access point. In even further embodiments wireless communication system 150 may comprise part of a different type of computing apparatus, such as a palmtop computer, a personal digital assistant (PDA), or a mobile computing device, as examples.

Wireless communication system 150 includes a physical layer interface (PHY) 151 that includes multiple antennas 152 and 153 capable of performing beamforming activities in the 60 GHz band, a transmit/receive (T/R) switch 154 for half-duplex operation, and a wireless transceiver 155 that includes a low-noise amplifier (LNA) 156, a power amplifier (PA) 158, and other radio frequency (RF) transceiver components 160 not shown. The physical layer also includes a data modem 162. Wireless communication system 150 further includes a media access controller 164 for layer-2 processing. A computer system data bus 168 is accommodated. Interfaces may be included e.g. one or more interfaces that conform to industry-standard Personal Computer Memory Card International Association (PCMCIA), peripheral component interconnect (PCI), universal serial bus (USB), and so forth.

The embodiment of FIG. 1D comprises a processor 165. Some embodiments may not specifically comprise a separate processor 165. For example, in one or more embodiments, the host processor function may be incorporated into media access controller 164. A random access memory (RAM) 166 is included for data buffering and program storage. RAM 166 may be directly coupled to processor 165, to media access controller 164, or to both.

In addition to the radio data between modern 162, transceiver 155, and media access controller 164 control information such as gain settings for the radio receiver from an automatic gain control module in modem 162, and other data, may be communicated between processor 165 (if included), media access controller 164, modem 162, and wireless transceiver 155.

Wireless communication system 150 may be compatible with various IEEE-802.11 standards for WLAN applications. RF transceiver 160 and modem 162 may constitute a wireless engine for OSI Layer-1 physical layer (PHY) functionality in broadband wireless LANs. Media access controller 164 may be IEEE-802.11-compliant for layer-2 processing. Wireless communication system 150 may reduce the amount of time for recovering multiple links in a wireless network via the PHY 151 and media access controller 164. For example, media access controller 164 may generate or assemble the values related to beamforming and include the beam forming values in FWD-TXSS or REV-TXSS frames to be transmitted by wireless communication system 150. Further, media access controller 164 may disassemble or interpret frames, received by wireless communication system 150, which include beamforming values. Further, PHY 151 may be configured to respond to control signals from processor 165 to manipulate antenna elements of antennas 152 and 153, so as to perform sector sweeping and other beamforming activities, such as adjusting gain and phase for the transmitted signals from antennas 152 and 153.

Many alternative embodiments of wireless communication system 150 may comprise additional components, while other alternative embodiments of wireless communication system 150 may comprise fewer components. For example, many embodiments of wireless communication system 150 may comprise a memory controller hub (MCH) and an I/O controller huh (ICH). In some embodiments, processor 165 may have one or more cores coupled with cache and one or more memory elements. The types of memory elements may vary in different embodiments. In some embodiments, the memory may comprise volatile memory elements, such as two 1-gigabyte (GB) dynamic random access memory (DRAM) sticks. In other embodiments, the memory may comprise nonvolatile memory. For example in some embodiments the memory may comprise a flash memory module, such as a 4 GB flash Memory card. Such memory may enable wireless communication device 150 to be updated, such as by a flash upgrade procedure. Alternatively, RAM 166 may be used to buffer data received or data to be transmitted.

In some embodiments, wireless communication system 150 may interact with external peripheral devices, such as keyboards, scanners, and data storage devices. Various embodiments of wireless communication system 150 may present information to a user via a display device. Various embodiments of wireless communication system 150 may also interact with Advanced Technology Attachment (ATA) devices, such as ATA hard drives, compact disc (CD) drives, and digital versatile disc (DVD) drives, as illustrated in FIG. 1A.

In some embodiments, configuration software and/or the operating system of wireless communication system 150 may have a selectable parameter which enables or disables the ability to reduce the amount of time for recovering multiple links in a wireless network based on system operating conditions, or hardware compatibility, as examples. For example, when installing a communication card comprising the elements of wireless communication system 150 into a desktop computer, a user may execute configuration software which installs drivers and other low-level software that enables the communication card to interact with the operating system and/or hardware of the desktop computer. During execution of the configuration software, the use may enable an option which causes wireless communication system 150 to disable the support for reduced overhead multiple-link recovery, or enable the support but disable some other optional feature which may interfere with the beamforming support. Depending on the embodiment, the configuration software may permit the user do completely disable the reduced overhead multiple-link recovery support feature, which may be necessary if wireless communication system 150 were to have an incompatibility issue with one or more devices in the local network.

Figure 7:
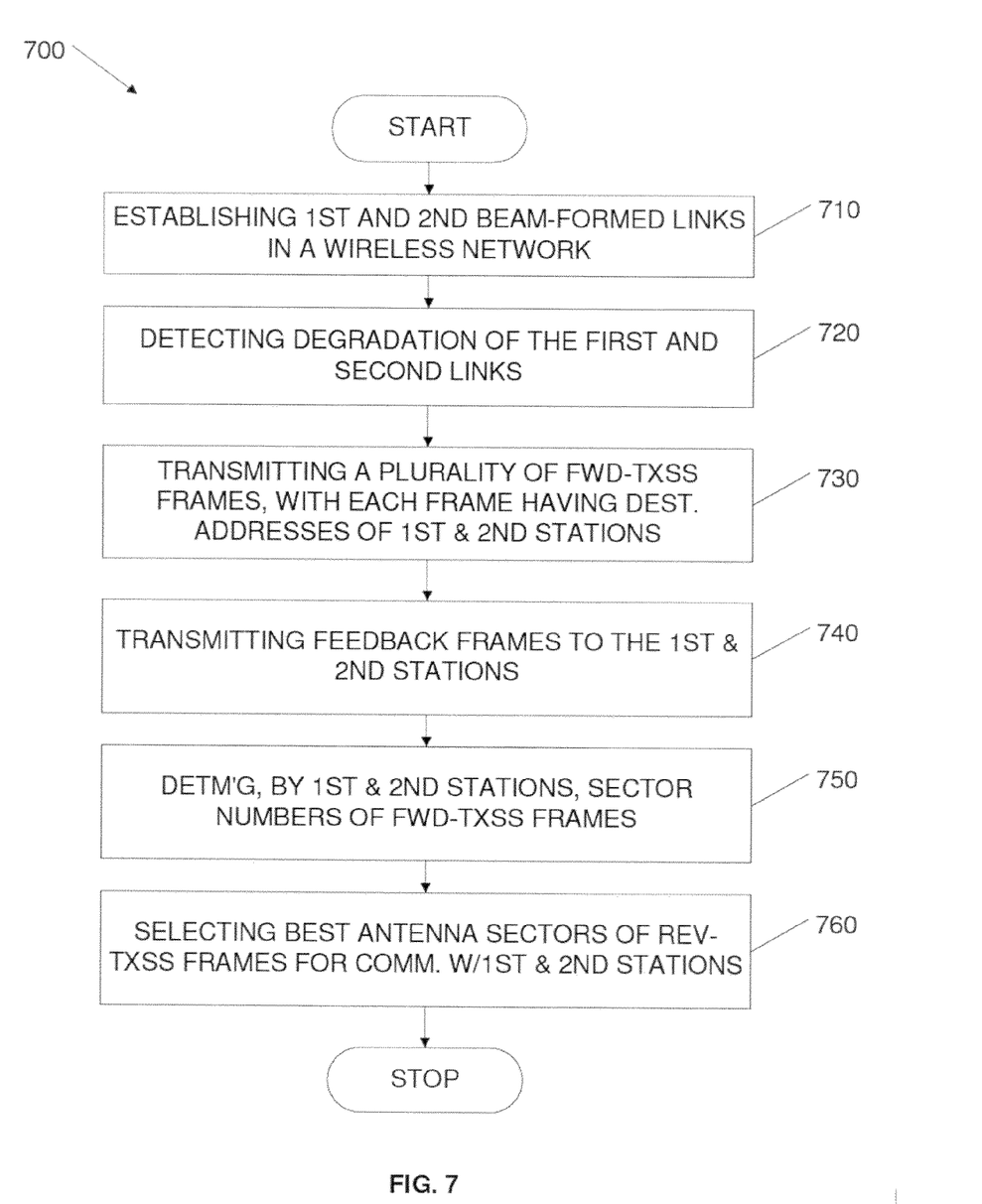
FIG. 7 illustrates a method for reducing the amount of time for recovering multiple links in a wireless network.

FIG. 7 depicts a flowchart 700 illustrating a method for reducing the amount of time for recovering multiple links in a wireless network. Flowchart 700 begins with establishing first and second beam-formed links in a wireless network (element 710). For example, with reference to FIG. 1A, station 101 may employ the beamforming procedure of FIG. 4 to discover and connect to stations 102 and 103 when a user turns on his laptop in a home networking environment. Flowchart 700 also includes detecting, by the multi-link station, degradation of the first link and degradation of the second link of the multi-link station (element 720). For example, station 101 may detect total loss of the multiple beam-formed links with stations 102 and 103 when the user of station 101 moves his laptop in the home networking environment.

Upon detecting the degradation of the multiple links (element 720), an embodiment according to flowchart 700 may continue by transmitting, by the multiple-link station, a plurality of frames of a forward sweep to the plurality of sectors, wherein each frame of the plurality comprises a destination address of the first station and a destination address of the second station (element 730). Continuing with the previous example, station 101 may transmit FWD-TXSS frames (element 505), wherein each frame includes the destination addresses of stations 102 and 103.

The multiple-link station may transmit a first feedback frame to the first station and a second feedback frame to the second station (element 740). For example, station 101 may transmit feedback frames 515 and 525 in response to transmission of the REV-TXSS frames of stations 102 and 103 (elements 510 and 520). One will note that each of the REV-TXSS frames of stations 102 and 103 are transmitted in response to transmission of the single slot of FWD-TXSS frames (element 505) by station 101.

According to element 750 of flowchart 700, stations 102 and 103 may determine sector numbers of the respective FWD-TXSS frames received by each station and communicate the determined sector numbers back to station 101 in the REV-TXSS frames (elements 510 and 520). For example, with reference to FIGS. 1A and 2A, station 102 may have determined that the sector number contained in the FWD-TXSS, frame that station 102 received corresponded to antenna sector "212". Station 102 may inform station 101 to transmit information to station 102 using antenna sector 212 for subsequent communications.

According to element 760 of flowchart 700, station 101 may receive and select the best sectors that stations 102 and 103 should each use to communicate with station 101 in subsequent frame transmissions. For example with reference to FIGS. 1A and 2A again, station 101 may receive one REV-TXSS frame from station 102 and determine that station 102 transmitted the frame via its antenna sector "205", and that a REV-TXSS frame from station 103 was sent via antenna sector "203". Station 101 will inform station 102 to transmit information to station 101 via its antenna sector "205" when station 101 transmits short feedback frame 515. Similarly, station 101 will inform station 103 to transmit information to station 101 via its antenna sector "203" when station 101 transmits short feedback frame 525.

As noted earlier in the discussions related to FIG. 1C and FIG. 1D, one or more portions of some embodiments may be implemented as a program product stored in a tangible medium for use with a process to perform operations for processes, such as the processes described in FIG. 5. The program(s) of the program product defines functions of the embodiments (including the methods described herein) and may be contained on a variety of data-bearing media. Illustrative data-bearing media include, but are not limited to: (i) information permanently stored on non-writable storage media (e.g., read-only memory devices within a station); and (ii) alterable information stored on writable storage media (e.g. flash memory). Such data-bearing media, when carrying computer-readable instructions that direct the functions of devices or systems, represent elements of some embodiments of the present invention.

In general, the routines executed to implement the embodiments, may be part of an operating system or a specific application, component, program, module, object, or sequence of instructions. The computer program of an embodiment may be comprised of a multitude of instructions that will be translated by a computer into a machine-readable format and hence executable instructions. Also, programs may be comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience and thus a specific embodiment should not be limited to use solely in any specific application identified and/or implied by such nomenclature.

It will be apparent to those skilled in the art having the benefit of this disclosure that the embodiments herein contemplate systems, apparatuses, and methods that reduce the amount of time for recovering multiple beam-formed links in a wireless network. It is understood that the form of the embodiments shown and described in the detailed description and the drawings are to be taken merely as examples. It is intended that the following claims be interpreted broadly to embrace all the variations of the embodiments disclosed.

Although some aspects have been described in detail for some embodiments, it should be understood that various changes, substitutions and alterations can be made herein without departing from the spirit and scope of the embodiments as defined by the appended claims. Although one embodiment may achieve multiple objectives, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the embodiments, processes, machines, manufacture, compositions of matter, means, methods, or steps, presently existing or later to be developed that perform substantially the same function or achieve substantially the same result as the corresponding embodiments described herein may be utilized according to the embodiments herein. Accordingly, the appended claims are intended to include within their scope such processes, machines, manufacture, compositions of matter, means, methods, or steps.

What is claimed is:

1. A method, comprising:
    detecting, by a multiple-link station, degradation of both a first link and a second link, wherein the first link is between the multiple-link station and a first station, wherein further the second link is between the multiple-link station and a second station, wherein further the first and second links comprise beam-formed links of a wireless network;
    transmitting, by the multiple-link station in response to the detecting degradation of the first and second links, a plurality of frames of a forward sweep to the plurality of sectors, wherein each frame of the plurality of frames of the forward sweep comprises a destination address of the first station and a destination address of the second station; and
    transmitting, by the multiple-link station, a first feedback frame to the first station and a second feedback frame to the second station, wherein the first feedback frame is in response to transmission of a first number of frames of reverse sweeping by the first station, wherein the second feedback frame is in response to transmission of a second number of frames of reverse sweeping by the second station, wherein transmission of the first number and the second number of frames of reverse sweeping are transmitted based on an order of destination addresses in the plurality of frames of the forward sweep in response to the plurality of frames of the forward sweep.

2. The method of claim 1, further comprising: establishing the first link and the second link via beamforming.

3. The method of claim 2, further comprising: receiving, by the first station, a first frame of the plurality of frames of the forward sweep and determining a sector number of the first frame.

4. The method of claim 3, further comprising: transmitting, by the first station, the first number of frames of the reverse sweeping, wherein each frame of the first number of frames of the reverse sweeping comprises the sector number of the first frame.

5. The method of claim 4, further comprising: receiving, by the second station, a second frame and a third frame of the plurality of frames of the forward sweep, selecting the second frame, and determining a sector number of the second frame.

6. The method of claim 5, further comprising: transmitting, by the second station, the second number of frames of the reverse sweeping, wherein each frame of the second number of frames of the reverse sweeping comprises the sector number of the second frame.

7. The method of claim 6, further comprising: receiving, by the multi-link station, the first number of frames of the reverse sweeping and the second number of frames of the reverse sweeping.

8. The method of claim 7, further comprising: determining, by the multi-link station from the first number of frames and the second number of frames, the sector number of the first frame and the sector number of the second frame.

9. The method of claim 8, further comprising: switching, by the first station, into an omni-directional mode of reception to receive the plurality of frames of the forward sweep.

10. An apparatus, comprising:
a receiver;
a transmitter coupled to an antenna, wherein the transmitter is configured to selectively transmit frames of a sector sweep in a plurality of sectors about a periphery of the antenna; and
a processor module coupled to the receiver and the transmitter, wherein the processor enables the transmitter to transmit the frames of the sector sweep upon detection of degradation of two wireless links between the receiver and two stations, wherein the two links are beam-formed wireless links, wherein further the processor enables the transmitter to transmit two feedback frames in response to two frames of reverse sweeps, each one of the two frames of the reverse sweeps transmitted sequentially from each one of the two stations based on an order of destination addresses in the frames of the sector sweep in response to the sector sweep, wherein each of the frames of the sector sweep comprises destination addresses of the two stations.

11. The apparatus of claim 10, wherein the transmitter transmits the frames of the sector sweep in the 60 gigahertz (GHz) band.

12. The apparatus of claim 11, wherein the antenna comprises an antenna array.

13. The apparatus of claim 11, wherein the processor includes the destination addresses of both of the two stations in the frames of the sector sweep.

14. The apparatus of claim 13, wherein the processor determines sector numbers to use in communicating with the two stations based upon sector numbers of the frames of reverse sweeps received from the two stations.

15. The apparatus of claim 14, wherein the processor uses the determined sector numbers for subsequent communications with the two stations.

16. An apparatus, comprising:
a receiver;
a transmitter coupled to an antenna, wherein the transmitter is configured to selectively transmit frames of a reverse sweep in a plurality of sectors about a periphery of the antenna; and
a processor coupled to the receiver and the transmitter, wherein the processor enables the receiver to receive a frame of a sector sweep upon detection of degradation of a wireless link between the receiver and a station, wherein the frame of the sector sweep comprises a destination address of the receiver and a destination address of a second station, wherein the link is a beam-formed wireless link, wherein further the processor enables the transmitter to transmit the frames of the reverse sweep in response to reception of the frame of the sector sweep, wherein further the processor determines when to transmit the frames of the reverse sweep based on an order of destination addresses in the frame of the sector sweep.

17. The apparatus of claim 16, wherein the transmitter transmits the frames of the reverse sweep in the 60 gigahertz (GHz) band.

18. The apparatus of claim 17, wherein the antenna comprises an antenna array.

19. The apparatus of claim 18, wherein the processor determines a sector number of the frame of the sector sweep from data in the frame of the sector sweep.

20. The apparatus of claim 19, wherein the processor includes the sector number in the frames of the reverse sweep to enable the station to transmit data to the receiver via a sector.

21. The apparatus of claim 20, wherein the processor enables the receiver to receive a feedback frame transmitted in response to the frames of the reverse sweep.

22. A system, comprising:
an antenna array;
a beamforming module coupled to the antenna array, wherein the beamforming module manipulates the antenna array to transmit frames of a sector sweep to a plurality of sectors about the antenna array, wherein further the beamforming module is configured manipulate the antenna array to transmit single frames to single sectors of the plurality of sectors;
a transmitter and a receiver coupled to the beamforming module; and
a processor coupled to the receiver and the transmitter, wherein the processor enables the transmitter to transmit the frames of the sector sweep upon detection of degradation of two wireless links between the receiver and two stations, wherein each of the frames of the sector sweep comprises destination addresses of the two stations, wherein the two links are beam-formed wireless links, wherein further the processor enables the transmitter to transmit two feedback frames in response to two frames of reverse sweeps, each one of the two frames of reverse sweeps transmitted sequentially from each one of the two stations in response to the sector sweep based on an order of destination addresses in the frames of the sector sweep.

23. The system of claim 22, further comprising random access memory (RAM) coupled to the processor, wherein the RAM enables buffering of data received via the receiver.

24. The system of claim 23, further comprising a flat panel display device coupled to processor wherein the processor is configured to decode multimedia data of the received data and generate a video stream for display via the flat panel display device.

25. The system of claim 23, further comprising an optical decoding device coupled to the processor, wherein the optical device is configured to read data from a Blu-ray disc, wherein further the processor is configured to create decoded data from the read data and transmit the decoded data via the transmitter.

* * * * *